(12) United States Patent
Di Pietro et al.

(10) Patent No.: US 11,371,846 B2
(45) Date of Patent: Jun. 28, 2022

(54) SYSTEMS AND METHODS FOR DETERMINING THE POSITION OF A DEVICE

(71) Applicant: Qatar Foundation for Education, Science and Community Development, Doha (QA)

(72) Inventors: Roberto Di Pietro, Doha (QA); Pietro Tedeschi, Doha (QA)

(73) Assignee: QATAR FOUNDATION FOR EDUCATION SCIENCE AND COMMUNITY DEVELOPMENT, Doha (QA)

(*) Notice: Subject to any disclaimer, the term of this patent is extended or adjusted under 35 U.S.C. 154(b) by 426 days.

(21) Appl. No.: 16/740,739

(22) Filed: Jan. 13, 2020

(65) Prior Publication Data

US 2020/0225040 A1    Jul. 16, 2020

Related U.S. Application Data

(60) Provisional application No. 62/792,018, filed on Jan. 14, 2019.

(51) Int. Cl.
  *G01S 19/42* (2010.01)
  *G01S 19/14* (2010.01)
  *G01C 21/02* (2006.01)

(52) U.S. Cl.
  CPC .............. *G01C 21/02* (2013.01); *G01S 19/14* (2013.01); *G01S 19/42* (2013.01)

(58) Field of Classification Search
  CPC .......... G01C 21/02; G01S 19/14; G01S 19/42
  See application file for complete search history.

(56) References Cited

U.S. PATENT DOCUMENTS

2018/0238690 A1    8/2018   Laine et al.

FOREIGN PATENT DOCUMENTS

| | | |
|---|---|---|
| CN | 103528587 A | 1/2014 |
| CN | 103759727 A | 4/2014 |
| EP | 3255381 A1 | 12/2017 |
| GB | 2464232 A | 4/2010 |
| JP | 2003302226 A | 10/2003 |
| WO | 2008045014 A2 | 4/2008 |
| WO | 2009017969 A2 | 2/2009 |
| WO | 2017158055 A1 | 9/2017 |
| WO | 2018125311 A2 | 7/2018 |

OTHER PUBLICATIONS

Mortari, Daniele, et al., "Star Pattern Recognition and Mirror Assembly Misalignment for DIGISTAR II and III Multiple FOVs Star Sensors", Texas A&M University, Jan. 1999.

*Primary Examiner* — Mathew Franklin Gordon
(74) *Attorney, Agent, or Firm* — Cooper Legal Group LLC

(57) ABSTRACT

Systems and methods for determining the position of a device or vehicle by using celestial information captured by an imaging apparatus. The systems and methods identify a star set in the celestial information, generate a star set fingerprint and compare the star set fingerprint with reference celestial information. Once a comparison is made, the location of the device or vehicle can be determined and used within a celestial navigation system.

20 Claims, 12 Drawing Sheets

Algorithm 1 Visual Celestial Navigation System

1: $\mathcal{G} = \emptyset$
2: $(H, \Phi) \leftarrow InitialDBImageParameters$
3: procedure FINDVEHICLEPOSITION($\{features\}, h, \theta$)
4:     $s_0 \leftarrow setInitialStar()$
5:     $starTranslation(s_0, h, \theta)$
6:     $\mathcal{G} \leftarrow addStarToGraph(s_0); i = 0$
7:     while ($foundPosition == FALSE$) do
8:         $s_{i+1} \leftarrow findNeighborStar(s_i)$
9:         $starTranslation(s_i, h, \theta)$
10:         $\mathcal{G} \leftarrow addStarToGraph(s_{i+1})$
11:         if $\mathcal{G}$ is unique then
12:             $foundPosition = TRUE$
13:         else
14:             $i++$
15:         end if
16:     end while
17:     Return $vehiclePosition$
18: end procedure

Figure 8

SYSTEMS AND METHODS FOR DETERMINING THE POSITION OF A DEVICE

CROSS-REFERENCE TO RELATED APPLICATIONS

The present application is a non-provisional filing of and claims priority to U.S. Provisional Patent Application 62/792,018, titled "Autonomous navigation system for smart vehicles" and filed on Jan. 14, 2019, which is incorporated herein by reference.

FIELD

The present invention relates to methods and systems for determining the position of a device. The present invention more particularly relates to methods and systems which use celestial navigation to determine the position of a vehicle.

BACKGROUND

Nowadays, each vehicle and smart technology objects, such as cars, ships, aircraft, smartphones, and smartwatches, are equipped with a navigation system e.g. the NAVigation Satellite Timing And Ranging Global Positioning System (NAVSTAR GPS), GLObal NAvigation Satellite System (GLONASS), Global Navigation Satellite System (GNSS), that leverage artificial satellites orbiting around Earth to compute their geographical coordinates.

The cited end-user components that provide these geographic data could be affected by technical issues such as battery failure, signal loss, and other technical problems. For instance, from the security point of view, geo trackers could be: i) compromised with a GPS spoofing technique used to either land a drone or re-route it to a particular location; ii) experience a disturb on the original signal (jamming attack); or, iii) even, in the case of an artificial satellite, it could suffer a cyber-attack from malicious users (e.g. shut-off). Note that, if satellite-navigation systems or trackers are compromised, each vehicle will fail to compute its geographical position.

There is a need for improved methods or systems for determining the position of a device which seek to alleviate at least some of the problems described herein.

SUMMARY

According to one aspect, there is provided a method for determining the position of a device, the method comprising: capturing, using at least one imaging apparatus, celestial information of a portion of the sky, the celestial information being indicative of at least one star parameter of a plurality of stars in the portion of sky; identifying a star set in the portion of sky by processing the celestial information to identify a plurality of stars having the at least one star parameter; generating a star set fingerprint which is indicative of the star set based on the relative positions of the stars in the star set and the at least one parameter; comparing the star set fingerprint with reference celestial information, the reference celestial information being indicative of at least one star parameter of a plurality of stars which are distributed across a plurality of tiles, each tile having a tile identifier and each tile corresponding to a portion of the sky when the sky is observed from a known location, wherein the comparison comprises: searching the reference celestial information for a star set having a reference star set fingerprint which corresponds to the star set fingerprint; and identifying each tile having a star in the star set, wherein the method further comprises; determining the position of the device relative to the known location based on the position of each identified tile relative to the plurality of tiles in the reference celestial information.

In some embodiments, the device is carried by an autonomous vehicle selected from a group including an aircraft, a car, a motorbike or a ship.

In some embodiments, the method further comprises: controlling the navigation of the vehicle in response to the determined position of the device.

In some embodiments, capturing celestial information comprises sensing at least one celestial parameter selected from a group including luminosity, mass, size, relative distance between stars, radius, colour or temperature.

In some embodiments, the imaging apparatus comprises a camera and a telescope.

In some embodiments, identifying the star set comprises recognising the positions of a plurality of stars relative to one another.

In some embodiments, the method further comprises: detecting the height of the device relative to a predetermined point on the earth; detecting the angle of observation of the stars by the imaging apparatus; and using the determined height of the device and the angle of observation to determine the position of the device relative to the earth.

In some embodiments, the method further comprises: defining each star in the star set as a node; and computing a link between each node and at least one of the other nodes to generate an undirected graph.

In some embodiments, each tile has the same predetermined width and height as the other tiles.

In some embodiments, the reference celestial information comprises data which is indicative of the position of a plurality of stars in the sky according to an equatorial coordinate system.

In some embodiments, the method further comprises: adding the captured celestial information to a graph and generating the star set fingerprint based on the graph.

In some embodiments, the method further comprises: dividing an image of the sky into a plurality of tiles; identifying a set of stars in each tile; generating a star set fingerprint for each identified set of stars; and storing each tile with a tile identifier and a star set fingerprint for each tile.

According to another aspect, there is provided a system for determining the position of a device, the system comprising: a processor; a memory storing reference celestial information, the reference celestial information being indicative of at least one star parameter of a plurality of stars which are distributed across a plurality of tiles, each tile having a tile identifier and each tile corresponding to a portion of sky when the sky is observed from a known location; and an imaging apparatus configured to capture celestial information of a portion of the sky, the celestial information being indicative of at least one star parameter of a plurality of stars in the portion of sky; an identification module which is configured to identify a star set in the portion of sky by processing the celestial information to identify a plurality of stars having the at least one star parameter; a fingerprinting module which is configured to generate a star set fingerprint which is indicative of the star set based on the relative positions of the stars in the star set and the at least one parameter; a search module which is configured to comparing the star set fingerprint with the reference celestial information by searching the reference celestial information for a star set having a reference star set fingerprint which corresponds to the star set fingerprint and identify each tile having a star in the star set; and a positioning module which is configured to determine the position of the device relative to the known location based on the position of each identified tile relative to the plurality of tiles in the reference celestial information.

In some embodiments, the system further comprises: a control module which is configured to control the navigation of a vehicle in response to the determined position of the device.

In some embodiments, the imaging apparatus is configured to sense at least one celestial parameter selected from a group including luminosity, mass, size, relative distance between stars, radius, colour or temperature.

In some embodiments, the imaging apparatus comprises a camera and a telescope.

In some embodiments, the system further comprises: a height detector which is configured to detect the height of the device relative to a predetermined point on the earth; and an observation angle detector which is configured to detect the angle of observation of the stars by the imaging apparatus, wherein the positioning module is configured to using the detected height of the device and the detected angle of observation to determine the position of the device relative to the earth.

In some embodiments, the reference celestial information comprises data which is indicative of the position of a plurality of stars in the sky according to an equatorial coordinate system.

According to another aspect, there is provided a navigation system for a vehicle, wherein the navigation system comprises: a processor; a memory storing reference celestial information, the reference celestial information being indicative of at least one star parameter of a plurality of stars which are distributed across a plurality of tiles, each tile having a tile identifier and each tile corresponding to a portion of sky when the sky is observed from a known location; and an imaging apparatus configured to capture celestial information of a portion of the sky, the celestial information being indicative of at least one star parameter of a plurality of stars in the portion of sky; an identification module which is configured to identify a star set in the portion of sky by processing the celestial information to identify a plurality of stars having the at least one star parameter; a fingerprinting module which is configured to generate a star set fingerprint which is indicative of the star set based on the relative positions of the stars in the star set and the at least one parameter; a search module which is configured to comparing the star set fingerprint with the reference celestial information by searching the reference celestial information for a star set having a reference star set fingerprint which corresponds to the star set fingerprint and identify each tile having a star in the star set; and a positioning module which is configured to determine the position of the device relative to the known location based on the position of each identified tile relative to the plurality of tiles in the reference celestial information.

In some embodiments, the system is carried by an autonomous vehicle selected from a group including an aircraft, a car, a motorbike or a ship.

BRIEF DESCRIPTION OF THE DRAWINGS

So that the present invention may be more readily understood, embodiments of the present invention will now be described, by way of example, with reference to the accompanying drawings, in which:

FIG. 8 shows the pseudo code of an algorithm of some embodiments.

DETAILED DESCRIPTION

Figure 1:
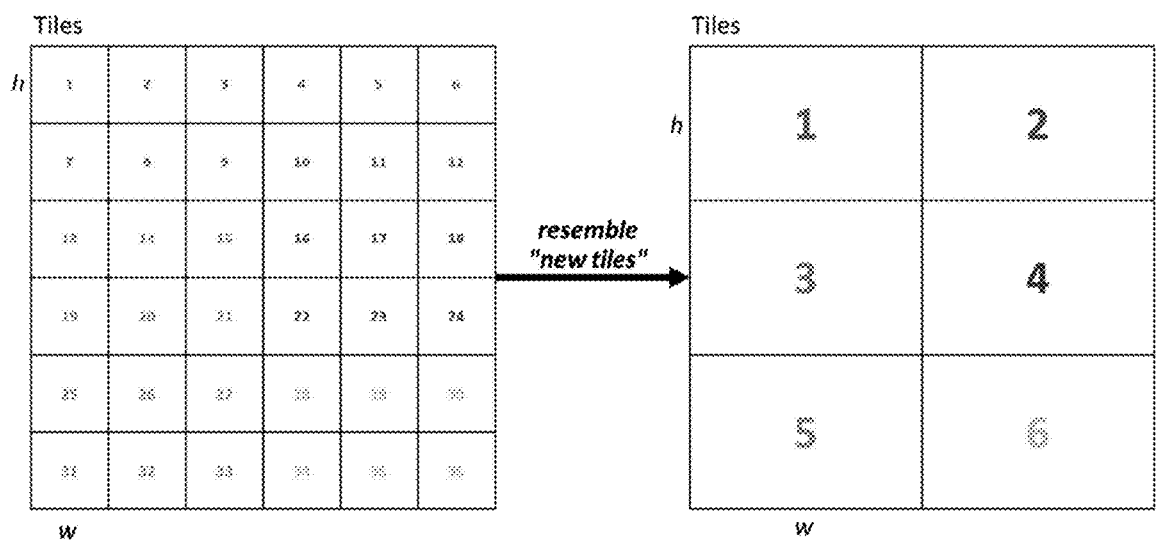
FIG. 1 is a schematic diagram illustrating a tile-based data structure with layering of some embodiments.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, concentrations, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

To address the problems outlined above, some embodiments seek to provide an approach that leverages a Visual Celestial Navigation System in order to recognize a star set, exploiting for instance, but not limited to, the brightness (or other features such as the luminosity, mass, size, the distance among the stars, radius, temperature) property in conjunction with the same set (or a subset of) properties of neighbouring stars, in order to estimate the position of a device and/or a vehicle.

An autonomous Visual Celestial Navigation System (VCNS) is described herein as an alternative mechanism, but not limited, to the Strapdown Inertial Navigation System (SINS) or the Instrumental Navigation System (INS).

The following description describes embodiments which are configured for use with a device or a vehicle. However, it is to be appreciated that the systems and methods are for use interchangeably with a device or a vehicle or any other navigation or positioning system or method.

In some embodiments, a vehicle comprises, for instance, but not limited to, a telescope and an Infrared filter (IR), to observe the celestial vault during the day. The vehicle will identify its position by using a technique to recognize a star set by analysing the stars and the star's neighbors' features.

As will be described in more detail below, in some embodiments the celestial vault is stored as reference celestial information which is defined as a grid, where each area, referred to hereinafter as a tile, has a default predetermined size. In some embodiments, the method and system comprises a processing arrangement which is configured to classify a particular star set, for instance, but not limited to, from hottest to coolest (O, B, A, F, G, K, M) by evaluating one or more features (e.g. the luminosity, mass, size, the distance among the stars, radius, color and temperature) of all stars defined in a tile and in the neighbourhood.

In some embodiments, each star is defined as a node, and each node is connected via a unique link to all its neighbours, each connection being undirected, hence generating an undirected graph.

In some embodiments, a database is provided which stores reference celestial information of star features, with the database being pre-loaded in a memory in the vehicle. This allows the vehicle to identify a star, evaluate the features of the star neighbourhoods, create a graph, and estimate the vehicle's position. Several use-cases are described below, as well as a defence/support mechanism to, but not limited to, mitigate possible Global Positioning System (GPS) spoofing attacks, GPS sensor failure, and jamming.

Methods and systems of some embodiments are configured to identify a star by evaluating: i) the star's features; and, ii) the features of other stars which are close to the star. In some embodiments, a particular star set recognition, based on the stars in a neighbourhood of tiles, is used as a fingerprint to determine the approximate vehicle's position.

The methods and systems of some embodiments store tiles instead of storing an entire sky map. This reduces the storage consumption and seeks to solve issues related to memory footprint when the method or system is used with a device or vehicle which has limited data storage. Furthermore, the tile-based data structure with layering of some embodiments has several benefits with respect to loading different large pre-rendered images in a vehicle's memory. The use of tiles in methods and systems of some embodiments can provide the following benefits: (i) the tiles are easy to manage; (ii) the tiles are memory-light; and, (iii) the tiles can be combined to resemble "new tiles" where more than one tile is selected to define a new tile, as shown in FIG. 1.

In some devices or vehicles, such as an unmanned air vehicle (UAV), the data processing capacity is limited and typically offers poor scalability, since sky maps are very detailed and contain many data features. The adoption of tiles in some embodiments and the identification of a star-set by considering the tile and the star-set fingerprint, will allow the methods and systems of some embodiments seeks to provide a robust, scalable, and precise solution for autonomous vehicle localization.

In order to provide a sky-based localization solution, the sky can be divided into tiles (e.g. having the same shape with height h and width w). The concept of fingerprinting is adopted to identify a particular star set in a neighbourhood of tiles. In this case, the fingerprint of a star set graph takes into account the features of the considered stars in the neighbourhood tiles, in order to provide a unique fingerprint. This fingerprint is used unequivocally to recognise the position of the vehicle.

As will be discussed below, the systems and methods of some embodiments provide an innovative and alternative navigation system and method which allows a vehicle to identify its position by leveraging for instance, but not limited to, the spectral properties of celestial bodies.

Figure 2:
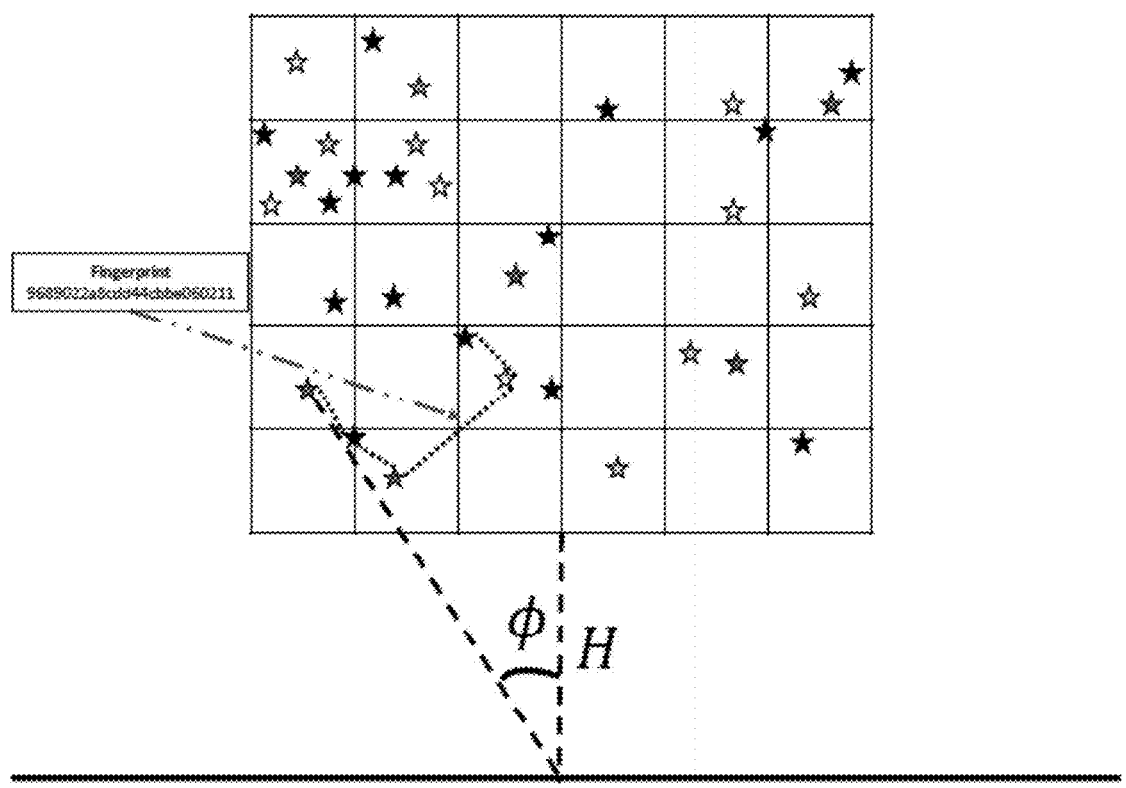
FIG. 2 is a schematic diagram which shows the operation of a method of some embodiments.

In some embodiments, a first phase of operation involves the processing of all data present in a celestial vault by analysing different well-defined data-sets. In some embodiments, the celestial vault is defined using a grid-based layout system, where each region of the grid is defined as a tile. Each tile has the same predetermined size as the other tiles. In this phase of operation, the images of the celestial vault are acquired at a known height H (for instance, but not limited to, sea level) with a known angle $\phi$, as depicted in FIG. 2. In some embodiments, right ascension, declination and hour angle can be used to find a star position.

The methods and systems of some embodiments uses a reference system where the coordinates do not vary with the position of the observer, such as (but not limited to) the mobile equatorial system. This property allows the description of a location to be completely independent from its relative position, as well as independent from the diurnal motion of the celestial sphere.

Figure 3:
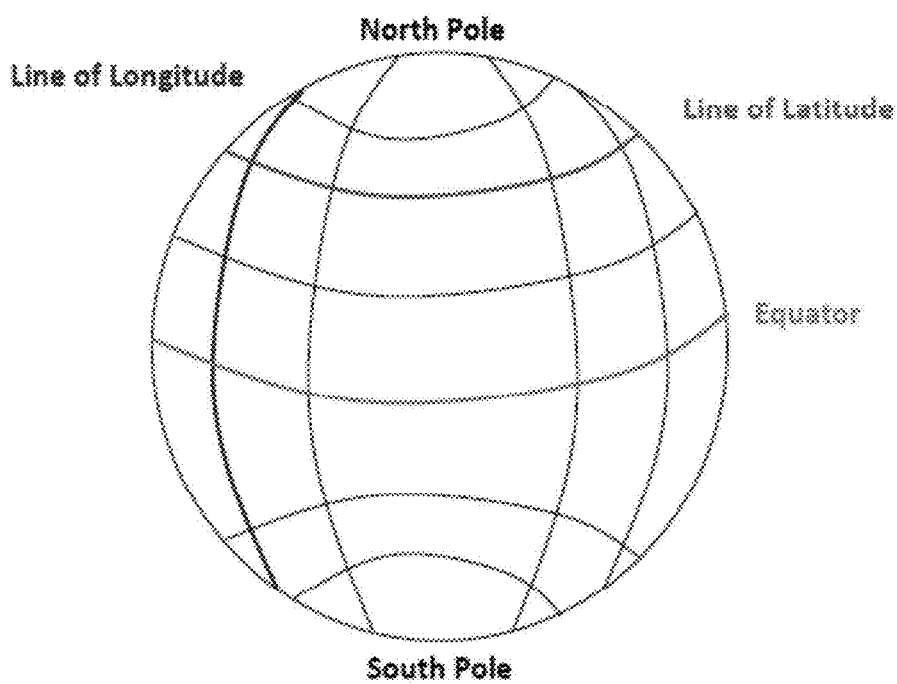
FIG. 3 is a schematic diagram showing the parameters of a celestial equatorial coordinate system of some embodiments.

FIG. 3 shows a mobile equatorial model (also known as a celestial equatorial coordinate system) which is used in some embodiments to create the tiles for the celestial vault (reference celestial information). In this model, the coordinates do not vary with the observer's position. The model therefore allows localization without considering the observer position. The methods and systems of some embodiments take into account on or more of:

Celestial equator

Meridian circles

First Point of Aries (Cusp of Aries)

The coordinates are: (i) the declination ($\delta$) of a star that is its angular distance from the celestial equator (from $-90°$ to the South Pole to $+90°$ to the North Pole); (ii) the right ascension (a) of a star that is the angular distance between the Point of Aries and the intersection of its hourly circle with the celestial equator. It is measured starting from the Point of Aries in an anti-clockwise direction in degrees (0°, 360°) or equivalently in hours placing 1 h=15°.

Two coordinates (angles) are needed to determine the position of a star two. The same is true on Earth, where two angles are required to identify a location (latitude and longitude). The projection of the terrestrial equator on the celestial sphere is known as the "celestial equator", while the projections of the poles are known as the celestial North Pole and the celestial South Pole. The point on the perpendicular of the observer (above the head) is known as the Zenith.

The two most commonly used coordinate systems are the equatorial and the altazimuth system. In the equatorial system a star is characterized by right ascension and declination. The right ascension is the angular distance of the star from a particular point of the celestial sphere, known as the "gamma point". The gamma point is the intersection of the celestial equator with the ecliptic (the path of the Sun and the planets in the sky, or the projection of the plane of the Solar System). The declination is measured by the celestial equator. Unlike the altazimuth coordinates (the coordinates of the same star at the same time are different for different observers), the equatorial coordinates do not change if the observer changes locations, and do not change during the day due to the Earth's rotation.

Figure 4:
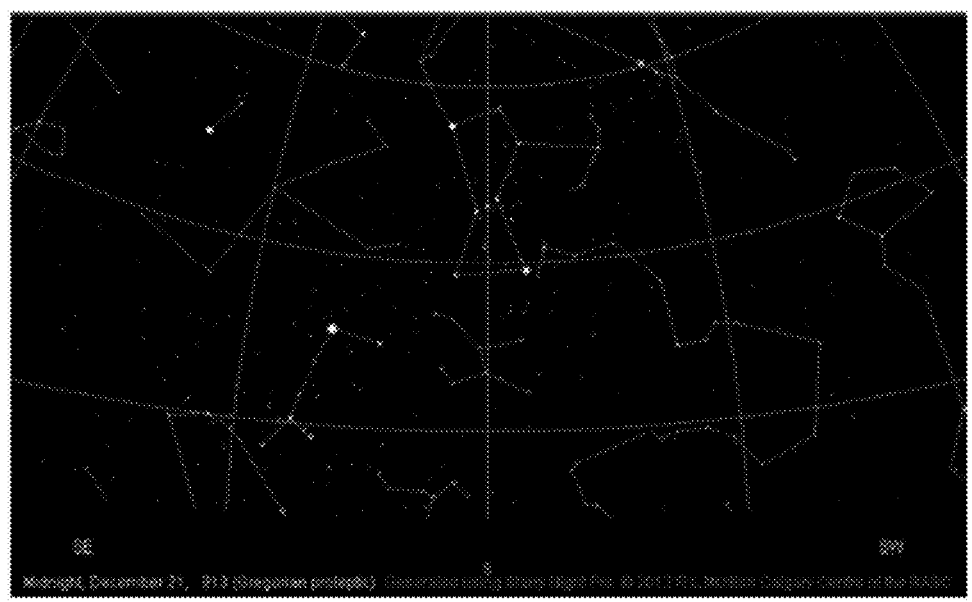
FIG. 4 is an example of tiles of a celestial sky map of some embodiments.

During the first phase of operation, the methods and systems of some embodiments capture the celestial vault and divide the celestial vault into tiles to provide reference celestial information for use during a navigation or positioning phase of operation. An example of tiles in reference celestial information is shown in FIG. 4.

The reference celestial information is stored in a database and at least partly stored in a memory within a device or vehicle. In some embodiments, the device or vehicle comprises an imaging apparatus in the form of a telescope. In some embodiments, the telescope is equipped with an IR filter to enable the system to observe celestial bodies and conduct navigation in daylight.

Within each tile, a set of stars is identified based on at least one star parameter, for instance the stars spectral properties, such as at least one of the luminosity and/or the mass, size, the distance among the stars, radius, colors or temperature. Each star is identified based on the at least one star parameter in conjunction with the same set (or a subset of) parameters of neighbouring stars.

The methods and systems of some embodiments defining each star in the star set as a node and compute a link between each node and at least one of the other nodes to generate an undirected graph. For instance, let G(S, E) a graph, where S is the set of identified stars and E the arcs set. If the graph containing the star set is unique, then it is possible to estimate with precision the vehicle's position, otherwise, other celestial bodies will be identified in addition to the graph, and when the uniqueness of the graph is achieved, the vehicle position will be identified. The uniqueness of the graph is achieved by considering the feature(s) selected for the classification.

Figure 5:
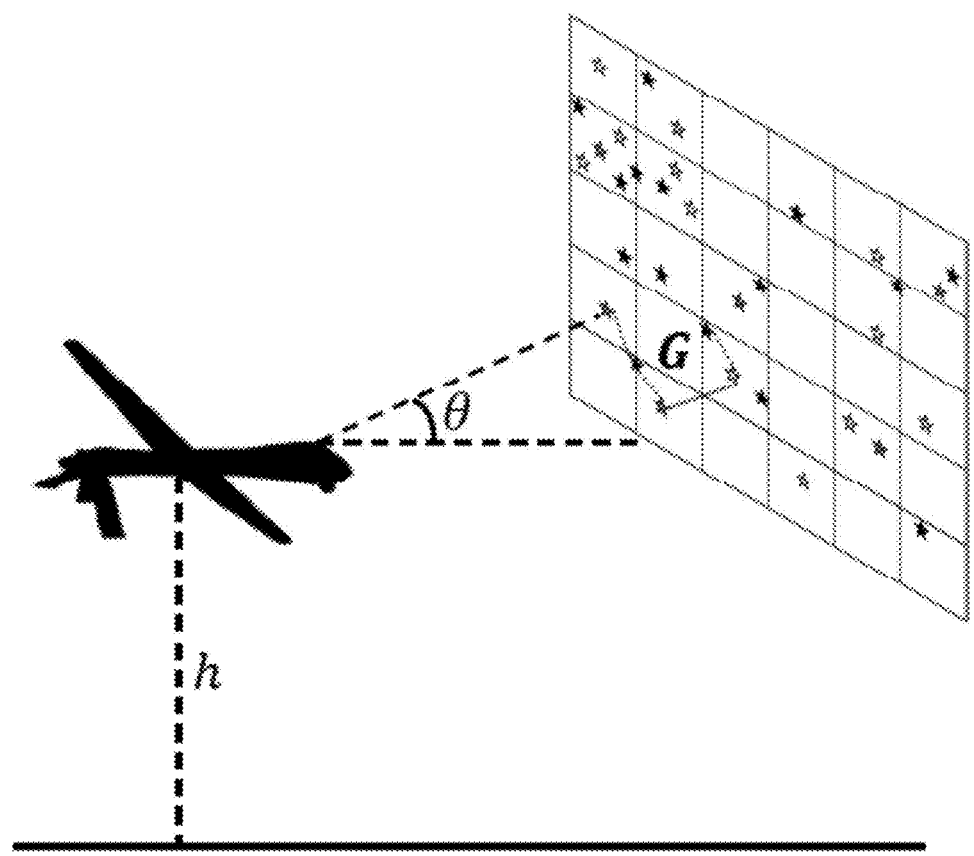
FIG. 5 is a schematic diagram illustrating a vehicle calculating its position by recognising a star set.
Figure 6:
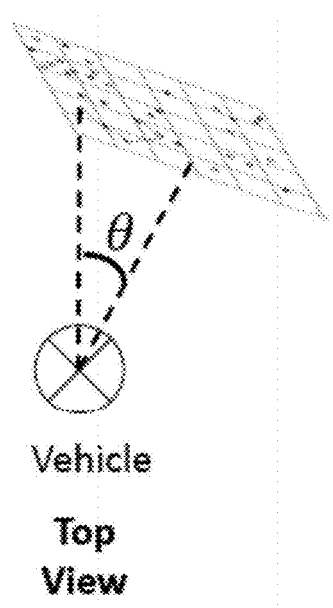
FIG. 6 is a top view of the vehicle shown in FIG. 5.

During a further phase of operation, images acquired by the vehicle at a known height H and with a known angle $\phi$ are translated to the parameters used during the first phase of operation (height H and angle $\phi$). In this further phase of operation, as depicted in FIGS. 5 and 6, a vehicle, in this case a UAV, with a known height H and with a known angle $\phi$ identifies a minimum star set, and calculates its position.

The system is able to operate when the traditional satellite navigation system is not operational, for instance due to a tracker battery failure, signal loss, GPS spoofing attack or a cyber-attack from a malicious party against an artificial satellite.

Figure 7:
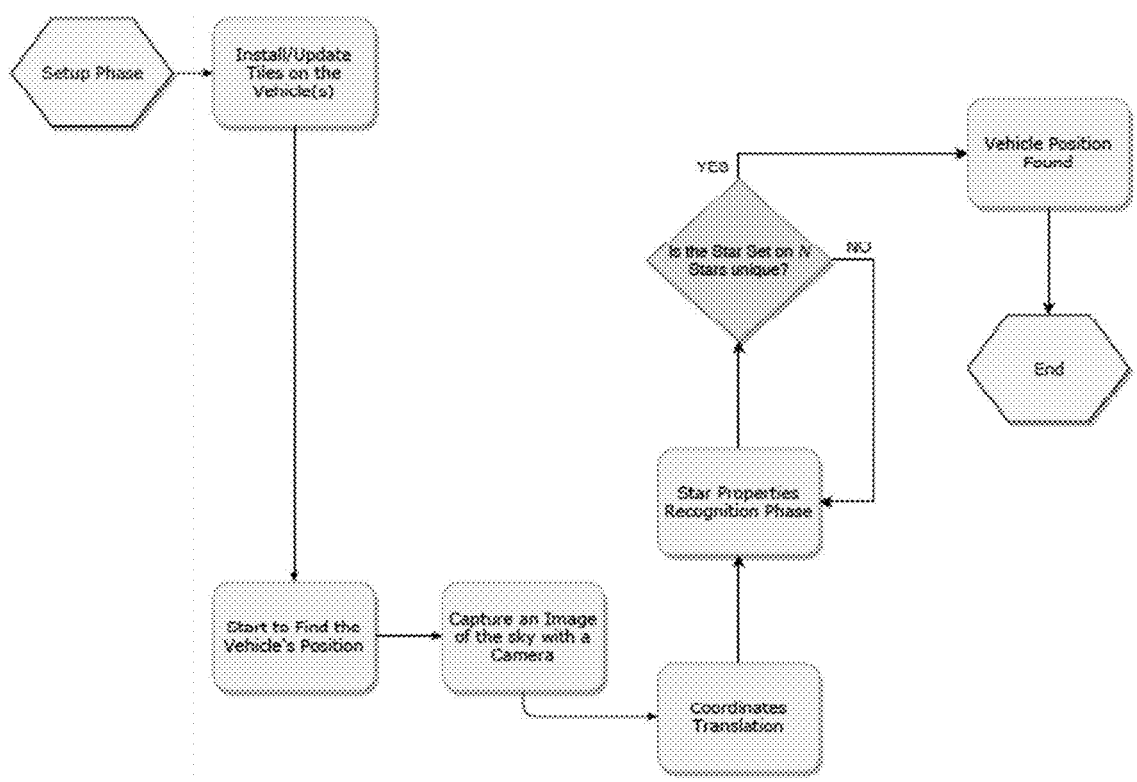
FIG. 7 is a flow diagram illustrating the operation of a method of some embodiments.

Referring now to FIG. 7, systems and methods of some embodiments operate generally as follows. It is appreciated that embodiments do not necessarily perform all phases of operation and in these embodiments some of the operating steps outlined below are omitted.

1. Setup Phase. The setup phase comprises loading sky map data divided in tiles (the reference celestial information) into a vehicle's memory. If the map-tiles are old, or need to be refreshed, an update of the tiles may be required (e.g. tiles updated with other details and/or updated fingerprints).
2. Image Acquisition. The vehicle starts to capture an image of the sky using an imaging apparatus, such as an on-board camera. Based on the coordinate reference system, the vehicle executes a process comprising an algorithm to translate the coordinates of the captured sky snapshot to the reference system coordinate provided for the tiles in the reference celestial information.
3. Fingerprint Star Recognition. This procedure allows the vehicle to identify a star set by recognising each a particular star having at least one star parameter (e.g. the luminosity, mass, size, the distance among the stars, radius, color or temperature). The star is added to a Graph (or another similar data structure). In this embodiment, once a predefined number of stars has been added to the graph, a fingerprint is computed by the system which is indicative of the star set.
4. Estimate Vehicle Position. Since the fingerprint representing a given star set is unique, and the data position considering the celestial equatorial coordinate system is also unique, the fingerprint searched within the reference celestial information in the database will return the coordinates which identify the position of the vehicle.

FIG. 8 shows an example pseudocode which describes for the operation of systems and methods of some embodiments.

The pseudocode shown in FIG. 8 describes an algorithm to identify a vehicle's position by recognising a particular star set based on at least one star parameter. The procedure starts by defining an empty star set, and the initial parameters (height and acquisition angle) used during the first phase of operation. The findVehiclePosition( ) function obtains three input parameters: the feature set, the vehicle's height and the vehicle's camera angle.

The procedure enables the system to: (i) identify an initial star with a procedure namely setInitialStar( ); (ii) translate its coordinates to the original acquired images during the first phase of operation by using the starTranslation( ) function; (iii) add the star to a graph with the addStarToGraph( ) procedure; (iv) recognise the neighbor stars exploiting the features set defined in input by using the findNeighborStar( ) function; and, (v) add the neighbour star to the graph.

If the fingerprint of the graph built by the procedure is unique in the celestial vault (the reference celestial information), the vehicle will be able to recognise its position, otherwise the procedure continues until the graph is unique. This part of the procedure is also illustrated by the flow diagram in FIG. 7.

It is to be appreciated that the procedure outlined above is just one procedure of some embodiments. Other embodiments may be configured to utilise a different procedure.

Figure 9:
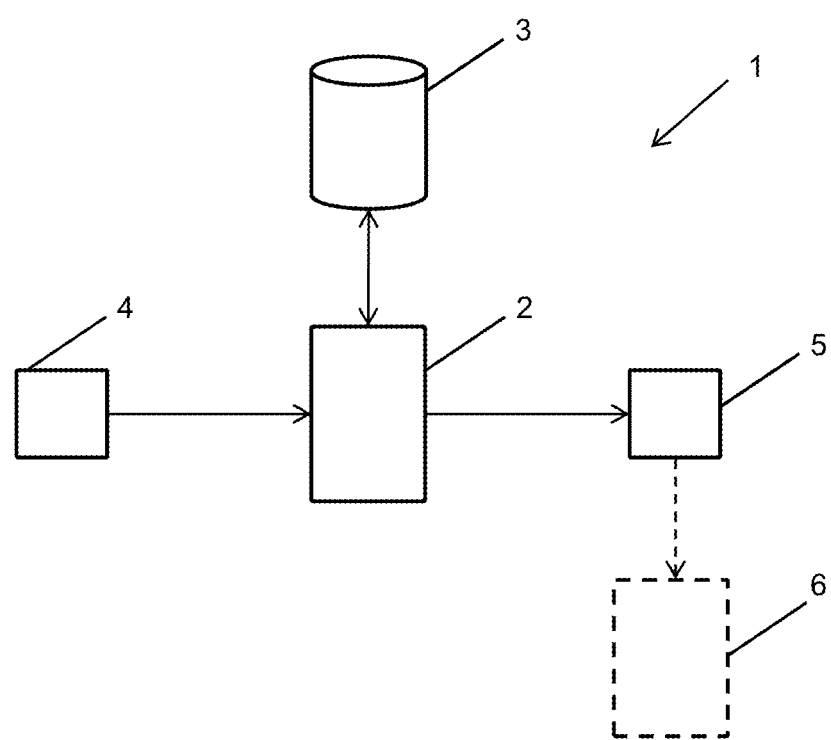
FIG. 9 is a schematic diagram of a system of some embodiments.

Referring now to FIG. 9 of the accompanying drawings, a system 1 of some embodiments comprises a processor 2 which is coupled for communication with a memory 3. In some embodiments, the system 1 forms part of a navigation system or device which is configured for use with a vehicle. In other embodiments, the system 1 is a system which is carried by a vehicle, such as a vehicle selected from a group including an aircraft, a car, a motorbike or a ship. In some embodiments, the vehicle is an autonomous vehicle and the system 1 is configured to control the navigation of the vehicle in response to a position determined by the system 1.

The system 1 comprises an imaging apparatus 4, such as a camera, which is coupled to the processor 2 and configured to provide imaging data to the processor 2.

The system 1 comprises an output module 5 which is coupled to the processor 2 and which is configured to output a signal generated by the system 1. In some embodiments, the output signal provided by the output module 5 is position data which describes the position of the system 1 and hence the position of the device or vehicle carrying the system 1.

In some embodiments, the system 1 further comprises a vehicle control module 6 which is coupled to the output module 5. The vehicle control module 6 is configured to control or navigate a vehicle in response to a position or navigation signal generated by the system 1.

In use, the system 1 is configured to capture, using the imaging apparatus 4, celestial information of a portion of the sky. The celestial information is indicative of at least one star parameter of a plurality of stars in the portion of sky. The processor 2 processes the captured celestial information to identify a star set in the portion of sky based on stars having at least one star parameter.

The processor 2 generates a star set fingerprint which is indicative of the star set based on the relative positions of the stars in the star set and the at least one parameter.

The system 1 compares the star set fingerprint with reference celestial information stored in the memory 3. The reference celestial information is indicative of at least one star parameter of a plurality of stars which are distributed across a plurality of tiles, each tile having a tile identifier and each tile corresponding to a portion of the sky when the sky is observed from a known location. The comparison which is performed by the system 1 searches the reference celestial information in the memory 3 for a star set having a reference star set fingerprint which corresponds to the star set fingerprint and identifies each tile having a star in the star set.

The system 1 then determines the position of the device or vehicle carrying the system 1 relative to the known location based on the position of each identified tile relative to the plurality of tiles in the reference celestial information.

In some embodiments, the system 1 comprises a height detector which is configured to detect the height of the device or vehicle relative to a predetermined point on the earth (e.g. sea level) and an observation angle detector which is configured to detect the angle of observation of the stars by the imaging apparatus 4. In these embodiments, the system is configured to use the determined height of the device and the angle of observation to determine the position of the device relative to the earth.

Use-Cases

Figure 10:
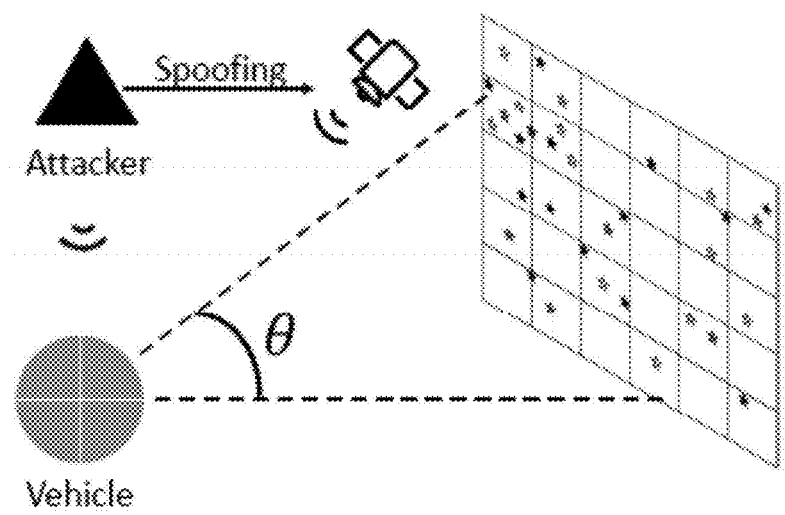
FIG. 10 is a schematic diagram illustrating an example of the operation of some embodiments.

Automated Visual Celestial Navigation for a Vehicle when Artificial Satellites are Compromised In this use-case, depicted in FIG. 10, a vehicle cannot use the GPS satellite to identify its position since a malicious user has compromised the GPS signal.
1. A malicious user attempts to turn off the GPS satellite with a physical/software attack.
2. The vehicle is not able to identify its position because it does not receive any GPS signal.
3. The vehicle activates its on board camera (e.g. a telescope).
4. The vehicle's processing unit starts the Autonomous Visual Celestial Navigation System to recognise a star set leveraging one or more star parameters.
5. A processing arrangement (for instance but not limited to, the pseudocode outlined above) estimates the vehicle's position, allowing the vehicle to identify its coordinates.
6. The vehicle can therefore proceed with the navigation even in situation where GPS signal is lost.

Figure 11:
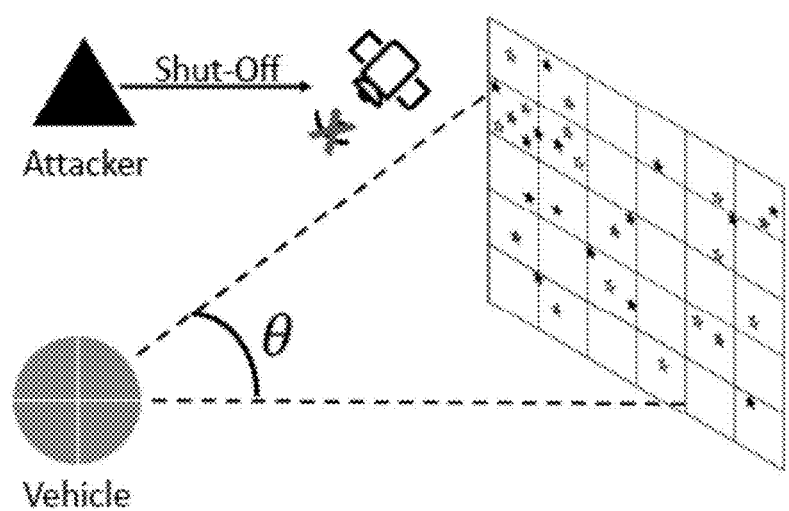
FIG. 11 is a schematic diagram illustrating an example of the operation of some embodiments.

Automated Visual Celestial Navigation for a Vehicle During a GPS Spoofing Attack In this use-case, depicted in FIG. 11, a vehicle is using a civil GPS satellite to identify its position. A malicious user is compromising the system with GPS spoofing.
1. A malicious user attempts to deceive a vehicle GPS receiver by broadcasting incorrect GPS signals (for instance, by using a Software Defined Radio (SDR)).
2. The vehicle is able to recognise a GPS spoofing attack because its original path has undergone unexpected changes.
3. The vehicle activates its on board camera (e.g. a telescope).
4. The vehicle's processing unit starts the Autonomous Visual Celestial Navigation System to recognise a star set leveraging one or more star parameters.
5. A processing arrangement (for instance but not limited to, the pseudocode outlined above) estimates the vehicle's position, allowing the vehicle to identify its coordinates.
6. The vehicle can therefore proceed with the navigation even in situation where there are incorrect GPS signals.

Automated Visual Celestial Navigation for a Vehicle During a GPS Jamming Attack

Figure 12:
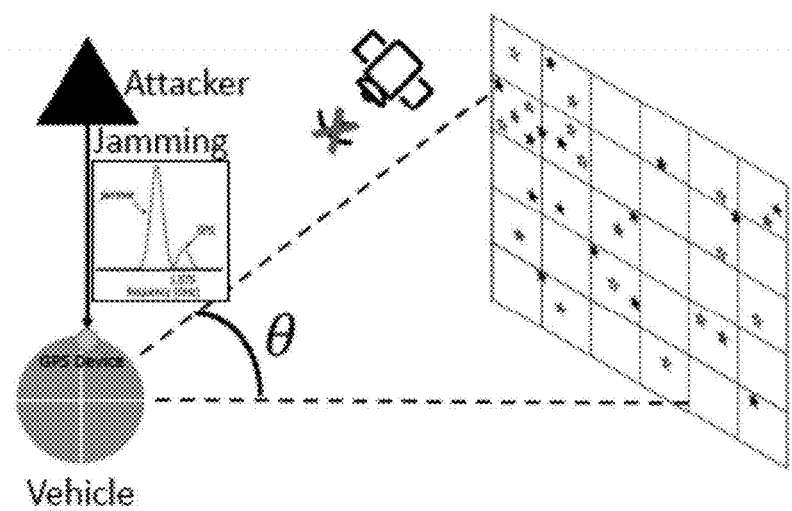
FIG. 12 is a schematic diagram illustrating an example of the operation of some embodiments.

In this use-case, depicted in FIG. 12, a vehicle uses a civil GPS satellite to identify its position. A malicious user compromises the system by jamming the GPS frequency (e.g., a first signal at 1575.42 MHz known as L1; and a second signal at 1227.60 MHz, known as L2).
1. A malicious user attempts to deceive a vehicle GPS receiver by broadcasting noise on the same frequency as the GPS signal (for instance by using a software defined radio (SDR)).
2. The vehicle is able to recognize a GPS jamming attack since the original GPS signal is lost.
3. The vehicle activates its on board camera (e.g. a telescope).
4. The vehicle's processing unit starts the Autonomous Visual Celestial Navigation System to recognise a star set leveraging one or more star parameters.
5. A processing arrangement (for instance but not limited to, the pseudocode outlined above) estimates the vehicle's position, allowing the vehicle to identify its coordinates.
6. The vehicle can therefore proceed with the navigation even in the presence of a jammer that is disturbing the GPS signal.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method for determining a position of a device, the method comprising:
   capturing, using at least one imaging apparatus, celestial information of a portion of a sky, the celestial information being indicative of at least one star parameter of a plurality of stars in the portion of the sky;
   identifying a star set in the portion of the sky by processing the celestial information to identify a plurality of stars having the at least one star parameter;
   generating a star set fingerprint which is indicative of the star set based on relative positions of stars in the star set and the at least one star parameter;
   comparing the star set fingerprint with reference celestial information, the reference celestial information being indicative of at least one star parameter of a plurality of stars which are distributed across a plurality of tiles, each tile having a tile identifier and each tile corresponding to a portion of the sky when the sky is observed from a known location, wherein comparing the star set fingerprint with the reference celestial information comprises:
      searching the reference celestial information for a star set having a reference star set fingerprint which corresponds to the star set fingerprint; and
      identifying each tile having a star in the star set
   determining the position of the device relative to the known location based on a position of each identified tile relative to the plurality of tiles in the reference celestial information.

2. The method of claim 1, wherein the device is carried by an autonomous vehicle selected from a group consisting of an aircraft, a car, a motorbike or a ship.

3. The method of claim 2, wherein the method further comprises:
   controlling navigation of the autonomous vehicle in response to the determined position of the device.

4. The method of claim 1, wherein capturing the celestial information comprises sensing at least one celestial parameter selected from a group consisting of luminosity, mass, size, relative distance between stars, radius, colour or temperature.

5. The method of claim 1, wherein the at least one imaging apparatus comprises a camera and a telescope.

6. The method of claim 1, wherein identifying the star set comprises recognising positions of a plurality of stars relative to one another.

7. The method of claim 1, wherein the method further comprises:
   detecting a height of the device relative to a predetermined point on earth;
   detecting an angle of observation of the stars by the imaging apparatus; and
   using the detected height of the device and the detected angle of observation to determine the position of the device relative to the earth.

8. The method of claim 1, wherein the method further comprises:
   defining each star in the star set as a node; and
   computing a link between each node and at least one of the other nodes to generate an undirected graph.

9. The method of claim 1, wherein each tile has a same predetermined width and height as the other tiles.

10. The method of claim 1, wherein the reference celestial information comprises data which is indicative of a position of a plurality of stars in the sky according to an equatorial coordinate system.

11. The method of claim 1, wherein the method further comprises:
    adding the celestial information to a graph, wherein generating the star set fingerprint comprises generating the star set fingerprint based on the graph.

12. The method of claim 1, wherein the method further comprises:
    dividing an image of the sky into a plurality of tiles;
    identifying a set of stars in each tile;
    generating a star set fingerprint for each identified set of stars; and
    storing each tile with a tile identifier and a star set fingerprint for each tile.

13. A system for determining a position of a device, the system comprising:
    a processor;
    a memory storing reference celestial information, the reference celestial information being indicative of at least one star parameter of a plurality of stars which are distributed across a plurality of tiles, each tile having a tile identifier and each tile corresponding to a portion of a sky when the sky is observed from a known location;
    an imaging apparatus configured to capture celestial information of a portion of the sky, the celestial information being indicative of at least one star parameter of a plurality of stars in the portion of the sky;
    an identification module configured to identify a star set in the portion of the sky by processing the celestial information to identify a plurality of stars having the at least one star parameter;
    a fingerprinting module configured to generate a star set fingerprint which is indicative of the star set based on relative positions of stars in the star set and the at least one star parameter;
    a search module configured to compare the star set fingerprint with the reference celestial information by searching the reference celestial information for a star set having a reference star set fingerprint which corresponds to the star set fingerprint and identify each tile having a star in the star set; and
    a positioning module configured to determine the position of the device relative to the known location based on a position of each identified tile relative to the plurality of tiles in the reference celestial information.

14. The system of claim 13, wherein the system further comprises:
    a control module configured to control navigation of a vehicle in response to the determined position of the device.

15. The system of claim 13, wherein the imaging apparatus is configured to sense at least one celestial parameter selected from a group consisting of luminosity, mass, size, relative distance between stars, radius, colour or temperature.

16. The system of claim 13, wherein the imaging apparatus comprises a camera and a telescope.

17. The system of claim 13, wherein the system further comprises:
- a height detector configured to detect a height of the device relative to a predetermined point on earth; and
- an observation angle detector configured to detect an angle of observation of the stars by the imaging apparatus, wherein the positioning module is configured to use the detected height of the device and the detected angle of observation to determine the position of the device relative to the earth.

18. The system of claim 13, wherein the reference celestial information comprises data which is indicative of a position of a plurality of stars in the sky according to an equatorial coordinate system.

19. A navigation system for a vehicle, wherein the navigation system comprises:
- a processor;
- a memory storing reference celestial information, the reference celestial information being indicative of at least one star parameter of a plurality of stars which are distributed across a plurality of tiles, each tile having a tile identifier and each tile corresponding to a portion of a sky when the sky is observed from a known location;
- an imaging apparatus configured to capture celestial information of a portion of the sky, the celestial information being indicative of at least one star parameter of a plurality of stars in the portion of the sky;
- an identification module configured to identify a star set in the portion of the sky by processing the celestial information to identify a plurality of stars having the at least one star parameter;
- a fingerprinting module configured to generate a star set fingerprint which is indicative of the star set based on relative positions of stars in the star set and the at least one star parameter;
- a search module configured to compare the star set fingerprint with the reference celestial information by searching the reference celestial information for a star set having a reference star set fingerprint which corresponds to the star set fingerprint and identify each tile having a star in the star set; and
- a positioning module configured to determine a position of the vehicle relative to the known location based on a position of each identified tile relative to the plurality of tiles in the reference celestial information.

20. The system of claim 19, wherein the vehicles is an autonomous vehicle selected from a group consisting of an aircraft, a car, a motorbike or a ship.

* * * * *